US010348861B2

(12) United States Patent
Duan

(10) Patent No.: US 10,348,861 B2
(45) Date of Patent: Jul. 9, 2019

(54) SOFTWARE UPGRADE METHOD AND TERMINAL

(71) Applicant: Huawei Technologies Co., Ltd., Shenzhen, Guangdong (CN)

(72) Inventor: Zhiyong Duan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 229 days.

(21) Appl. No.: 15/293,730

(22) Filed: Oct. 14, 2016

(65) Prior Publication Data

US 2017/0034309 A1 Feb. 2, 2017

Related U.S. Application Data

(63) Continuation of application No. PCT/CN2014/075488, filed on Apr. 16, 2014.

(51) Int. Cl.

| *G06F 15/177* | (2006.01) |
| *H04L 29/08* | (2006.01) |
| *G06F 8/65* | (2018.01) |
| *H04L 29/06* | (2006.01) |

(52) U.S. Cl.
CPC .............. *H04L 67/34* (2013.01); *G06F 8/65* (2013.01); *H04L 67/06* (2013.01); *H04L 67/42* (2013.01)

(58) Field of Classification Search
USPC ................. 709/217, 218, 220, 221, 224, 226
See application file for complete search history.

(56) References Cited

U.S. PATENT DOCUMENTS

| 2007/0130264 | A1* | 6/2007 | Walker ............... H04L 41/0668 709/206 |
| 2010/0070963 | A1* | 3/2010 | Bae ..................... H04W 8/245 717/171 |
| 2011/0197187 | A1* | 8/2011 | Roh ......................... G06F 8/65 717/173 |
| 2012/0180034 | A1* | 7/2012 | Hatamoto ............... G06F 8/65 717/168 |
| 2013/0124696 | A1* | 5/2013 | Chu ..................... G06F 21/121 709/219 |

(Continued)

FOREIGN PATENT DOCUMENTS

| CN | 101853184 A | 10/2010 |
| CN | 102521003 A | 6/2012 |

(Continued)

*Primary Examiner* — Liang Che A Wang

(57) ABSTRACT

The present invention relates to a software upgrade method for a terminal. The method includes: receiving, by a second terminal, a first message broadcast by at least one first terminal, where the first message includes information of application software maintained by the first terminal; determining, by the second terminal according to the information of the application software maintained by the first terminal, whether there is upgradeable application software on the second terminal; when it is determined that there is upgradeable application software on the second terminal, sending an upgrade request to the first terminal; receiving, by the second terminal, an upgrade response that is returned by the first terminal according to the upgrade request, and downloading upgrade data of the upgradeable application software; and updating the application software according to the upgrade data of the upgradeable application software.

16 Claims, 5 Drawing Sheets

(56) References Cited

U.S. PATENT DOCUMENTS

2014/0101647 A1    4/2014   Huang
2014/0129859 A1*   5/2014   O'Malley ............ G06F 1/3209
                                                                                       713/323

FOREIGN PATENT DOCUMENTS

| CN | 102591942 A | 7/2012 |
| CN | 103476002 A | 12/2013 |
| CN | 103677863 A | 3/2014 |
| CN | 103716390 A | 4/2014 |
| CN | 103810010 A | 5/2014 |
| WO | 2008048745 A2 | 4/2008 |

* cited by examiner

SOFTWARE UPGRADE METHOD AND TERMINAL

CROSS-REFERENCE TO RELATED APPLICATIONS

This application is a continuation application of International Patent Application No. PCT/CN2014/075488, filed on Apr. 16, 2014, the disclosure of which is hereby incorporated by reference in its entirety.

TECHNICAL FIELD

The present invention relates to the field of communications, and in particular, to a software upgrade method and terminal.

BACKGROUND

At present, for software upgrade, an upgrade server is usually set on the Internet. A terminal that fails to be connected to the Internet cannot be upgraded. Moreover, even if the Internet is available, there may be no upgrade service available. In the prior art, an upgrade server is set on the Internet, and a terminal is upgraded when the terminal is connected to the upgrade server. However, upgrade cannot be performed in a case in which a terminal is not connected to the Internet or there is no related upgrade service available on the Internet, and it is not achieved to provide an upgrade service within the range of a local area network.

SUMMARY

Embodiments of the present invention provide a software upgrade method and terminal, so as to achieve software upgrade between terminals, so that in a case in which a terminal is not connected to the Internet or there is no related upgrade service available on the Internet, software upgrade of the terminal can still be implemented.

According to a first aspect, an embodiment of the present invention provides a software upgrade method, applied to a second terminal in a local area network, where the local area network further includes at least one first terminal, and the method includes:

receiving, by the second terminal, a first message broadcast by the at least one first terminal, where the first message includes information of application software maintained by the first terminal, and the information of the application software includes a software name of the application software and version information of the application software;

determining, by the second terminal according to the information of the application software maintained by the first terminal, whether there is upgradeable application software on the second terminal;

when it is determined that there is upgradeable application software on the second terminal, sending an upgrade request to the first terminal, where the upgrade request is used to acquire, from the first terminal, upgrade data of the upgradeable application software on the second terminal, and the upgrade data includes a name of the upgradeable application software on the second terminal;

receiving, by the second terminal, an upgrade response that is returned by the first terminal according to the upgrade request, and downloading the upgrade data of the upgradeable application software; and updating the upgradeable application software according to the upgrade data of the upgradeable application software.

With reference to the first aspect, in a first possible implementation manner, the determining, by the second terminal according to the information of the application software maintained by the first terminal, whether there is upgradeable application software on the second terminal specifically includes:

determining, according to the software name of the application software, whether there is application software the same as one piece among the application software maintained by the first terminal;

determining, according to the version information of the application software, whether the application software, the same as the one piece among the application software maintained by the first terminal, on the second terminal needs to be upgraded; and when the application software, the same as the one piece among the application software maintained by the first terminal, on the second terminal needs to be upgraded, determining that there is upgradeable application software on the second terminal.

With reference to the first aspect, in a second possible implementation manner, after the determining, by the second terminal according to the information of the application software maintained by the first terminal, whether there is upgradeable application software on the second terminal, the method further includes:

determining a target first terminal from the at least one first terminal according to information of application software maintained by each first terminal among the at least one first terminal; and the sending an upgrade request to the first terminal is specifically:

sending the upgrade request to the target first terminal.

With reference to the second possible implementation manner of the first aspect, in a third possible implementation manner, the determining a target first terminal from the at least one first terminal according to information of application software maintained by each first terminal among the at least one first terminal is specifically:

determining the target first terminal of the second terminal according to different version numbers, in the information of the application software maintained by each first terminal, of the upgradeable application software of the second terminal.

With reference to the first aspect, in a fourth possible implementation manner, the information of the application software maintained by the first terminal further includes an upgrade policy of the application software, and the upgrade policy specifically includes: maximum traffic for upgrading and/or a recommendation value of the application software and/or a type of the application software; and the second terminal further determines, according to the upgrade policy, whether there is upgradeable application software on the second terminal.

According to a second aspect, an embodiment of the present invention provides a software upgrade method, applied to a first terminal in a local area network, where the local area network further includes at least one second terminal, and the method includes:

broadcasting, by the first terminal, at least one first message, where the first message includes information of application software maintained locally, and the information of the application software includes a software name of the application software and a version number of the application software;

receiving an upgrade request sent by the second terminal, where the upgrade request is used to acquire, from the first terminal, upgrade data of upgradeable application software on the second terminal, and the upgrade data includes a name of the upgradeable application software on the second terminal, and the upgradeable application software on the second terminal is determined by the second terminal according to the information of the application software maintained by the first terminal; and sending an upgrade response to the second terminal, to trigger the second terminal to download, from the first terminal, the upgrade data of the upgradeable application software.

With reference to the second aspect, in a first possible implementation manner, the information of the application software further includes an upgrade policy of the application software, and the upgrade policy specifically includes: maximum traffic for upgrading and/or a recommendation value of the application software and/or a type of the application software; and when download traffic of the second terminal exceeds the download traffic threshold, the first terminal limits the download traffic of the second terminal.

According to a third aspect, an embodiment of the present invention provides a terminal, where the terminal and at least one first terminal are located in a same local area network, and the terminal includes:

a first receiving unit, configured to receive a first message broadcast by the at least one first terminal, where the first message includes information of application software maintained by the first terminal, and the information of the application software includes a software name of the application software and version information of the application software;

a first determining unit, configured to determine, according to the information of the application software maintained by the first terminal, whether there is upgradeable application software on the local terminal;

a sending unit, configured to: when it is determined that there is upgradeable application software on the local terminal, send an upgrade request to the first terminal, where the upgrade request is used to acquire, from the first terminal, upgrade data of the upgradeable application software on the local terminal, and includes a name of the upgradeable application software on the local terminal;

a second receiving unit, configured to receive an upgrade response that is returned by the first terminal according to the upgrade request, and download the upgrade data of the upgradeable application software; and an update unit, configured to update the upgradeable application software according to the upgrade data of the upgradeable application software.

With reference to the third aspect, in a first possible implementation manner, the first determining unit further includes:

a first determining subunit, configured to determine, according to the software name of the application software, whether there is application software the same as one piece among the application software maintained by the first terminal;

a second determining subunit, configured to determine, according to the version information of the application software, whether the application software, the same as the one piece among the application software maintained by the first terminal, on the second terminal needs to be upgraded; and a third determining subunit, configured to: when the application software, the same as the one piece among the application software maintained by the first terminal, on the second terminal needs to be upgraded, determine that there is upgradeable application software on the second terminal.

With reference to the third aspect, in a second possible implementation manner, the terminal further includes:

a second determining unit, configured to determine a target first terminal from the at least one first terminal according to information of application software maintained by each first terminal among the at least one first terminal; where the sending unit is specifically configured to send the upgrade request to the target first terminal.

With reference to the second possible implementation manner of the third aspect, in a third possible implementation manner, the second determining unit is specifically configured to determine the target first terminal of the second terminal according to different version numbers, in the information of the application software maintained by each first terminal, of the upgradeable application software of the second terminal.

With reference to the third aspect, in a fourth possible implementation manner, the information of the application software maintained by the first terminal further includes an upgrade policy of the application software, and the upgrade policy specifically includes: maximum traffic for upgrading and/or a recommendation value of the application software and/or a type of the application software; and the first determining unit is further configured to determine, according to the upgrade policy, whether there is upgradeable application software on the local terminal.

According to a fourth aspect, an embodiment of the present invention provides a terminal, applied in a local area network, where the local area network further includes at least one second terminal, and the terminal includes:

a broadcast unit, configured to broadcast at least one first message, where the first message includes information of application software maintained locally, and the information of the application software includes a software name of the application software and a version number of the application software;

a receiving unit, configured to receive an upgrade request sent by the second terminal, where the upgrade request is used to acquire, from the local terminal, upgrade data of upgradeable application software on the second terminal, and the upgrade data includes a name of the upgradeable application software on the second terminal, and the upgradeable application software on the second terminal is determined by the second terminal according to the information of the application software maintained locally; and a response unit, configured to send an upgrade response to the second terminal, to trigger the second terminal to download, from the local terminal, the upgrade data of the upgradeable application software.

With reference to the fourth aspect, in a first possible implementation manner, the information of the application software further includes an upgrade policy of the application software, and the upgrade policy specifically includes: maximum traffic for upgrading and/or a recommendation value of the application software and/or a type of the application software; and the terminal further includes:

a download control unit, configured to: when download traffic of the second terminal exceeds the download traffic threshold, limit the download traffic of the second terminal.

According to a fifth aspect, an embodiment of the present invention provides a terminal, where the terminal and at least one first terminal are located in a same local area network, and the terminal includes the following parts that are connected by using a bus:

a network interface;

a processor;

a memory; and an application program physically stored in the memory, where the application program includes instructions that can be used to enable the processor to execute the following process:

receiving, by using the network interface, a first message broadcast by the at least one first terminal, where the first message includes information of application software maintained by the first terminal, and the information of the application software includes a software name of the application software and version information of the application software;

determining, by the processor according to the information of the application software maintained by the first terminal, whether there is upgradeable application software on the second terminal;

when it is determined that there is upgradeable application software on the second terminal, sending an upgrade request to the first terminal by using the network interface, where the upgrade request is used to acquire, from the first terminal, upgrade data of the upgradeable application software on the second terminal, and the upgrade data includes a name of the upgradeable application software on the second terminal;

receiving, by using the network interface, an upgrade response that is returned by the first terminal according to the upgrade request, and downloading the upgrade data of the upgradeable application software; and updating, by the processor, the upgradeable application software according to the upgrade data of the upgradeable application software.

According to a sixth aspect, an embodiment of the present invention provides a terminal, where the terminal and at least one second terminal are located in a same local area network, and the terminal includes the following parts that are connected by using a bus:

a network interface;

a processor;

a memory; and an application program physically stored in the memory, where the application program includes instructions that can be used to enable the processor to execute the following process:

broadcasting at least one first message by using the network interface, where the first message includes information of application software maintained locally, and the information of the application software includes a software name of the application software and a version number of the application software;

receiving, by using the network interface, an upgrade request sent by the second terminal, where the upgrade request is used to acquire, from the first terminal, upgrade data of upgradeable application software on the second terminal, and the upgrade data includes a name of the upgradeable application software on the second terminal, and the upgradeable application software on the second terminal is determined by the second terminal according to the information of the application software maintained by the first terminal; and sending an upgrade response to the second terminal by using the network interface, to trigger the second terminal to download, from the first terminal, the upgrade data of the upgradeable application software.

Therefore, by means of the software upgrade method for a terminal and the terminal provided in the embodiments of the present invention, in a case in which a terminal is not connected to the Internet or there is no related upgrade service available on the Internet, upgrade can be performed for a user, and terminals in a short-distance communications network are used as providers of upgrade services to mutually perform upgrade.

DETAILED DESCRIPTION

To make the objectives, technical solutions, and advantages of the present invention clearer, the following further describes the technical solutions of the present invention in detail with reference to the accompanying drawings and embodiments.

The terms used in the embodiments of the present invention are merely for the purpose of illustrating specific embodiments, and are not intended to limit the present invention. The terms "a", "said" and "the" of singular forms used in the embodiments and the appended claims of the present invention are also intended to include plural forms, unless otherwise specified in the context clearly. It should also be understood that, the term "and/or" used herein indicates and includes any or all possible combinations of one or more associated listed items.

It should be understood that although the terms such as first and second may be used in the embodiments of present invention to describe various terminals, the terminals should not be limited to these terms. These terms are merely used to differentiate the terminals from each other.

In an actual application environment, a terminal includes a client and a server, a first terminal and a second terminal are located in a same local area network, the first terminal maintains application software upgrade information, and a client of the second terminal and a server of the first terminal perform communication. In addition, the terminal may also be a handheld terminal, for example, a handheld device such as a smartphone and a tablet computer. A hardware terminal is used as a server, and a software display interface is used as a client, which are generally referred to as a terminal in the following embodiments, and no further details are provided again.

Figure 1:
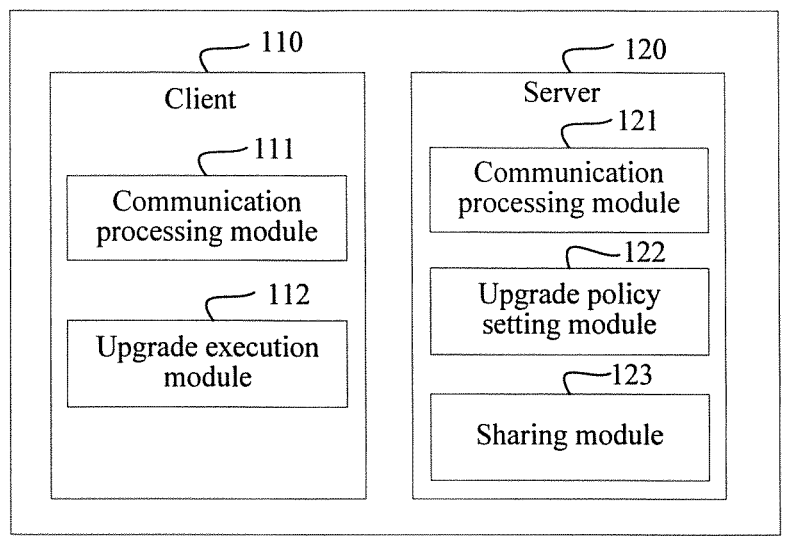
FIG. 1 is a structural diagram of an embodiment of a terminal according to an embodiment of the present invention.

FIG. 1 is a first apparatus diagram of a terminal according to an embodiment of the present invention. In FIG. 1, the terminal includes a client 110 and a server 120. The client 110 is configured to upgrade application software according to another terminal, and the client 110 includes a first communication processing module 111 and an upgrade execution module 112. The server 120 is configured to set application software upgrade information of the local terminal, and the server 120 includes a second communication processing module 121, an upgrade policy setting module 122, and a sharing module 123. The functions of the modules are as follows:

The sharing module 123 is configured to designate which application software on the local terminal can provide an upgrade service. The upgrade policy setting module 122 is configured to set an upgrade policy of the software, where the upgrade policy of the software may be maximum traffic for upgrading the application software or a type of the application software. The upgrade execution module 112 is configured to execute processes of monitoring, downloading and installation of the application software. The first communication processing module 111 and the second communication processing module 121 are configured to communicate with another terminal, for example, send an upgrade request and/or upgrade response.

Figure 2:
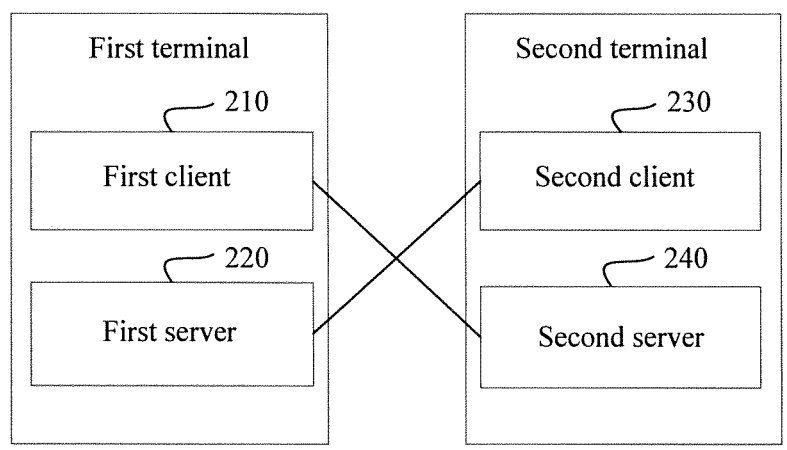
FIG. 2 is a structural diagram of an embodiment of a terminal according to an embodiment of the present invention.

FIG. 2 is a first structural diagram of a terminal according to an embodiment of the present invention. FIG. 2 includes a first terminal and a second terminal. The first terminal includes a first client 210 and a first server 220, and the second terminal includes a second client 230 and a second server 240.

The second server 240 may provide application software upgrade information to the first client 210, and the first server 220 may provide application software upgrade information to the second client 230.

Figure 3:
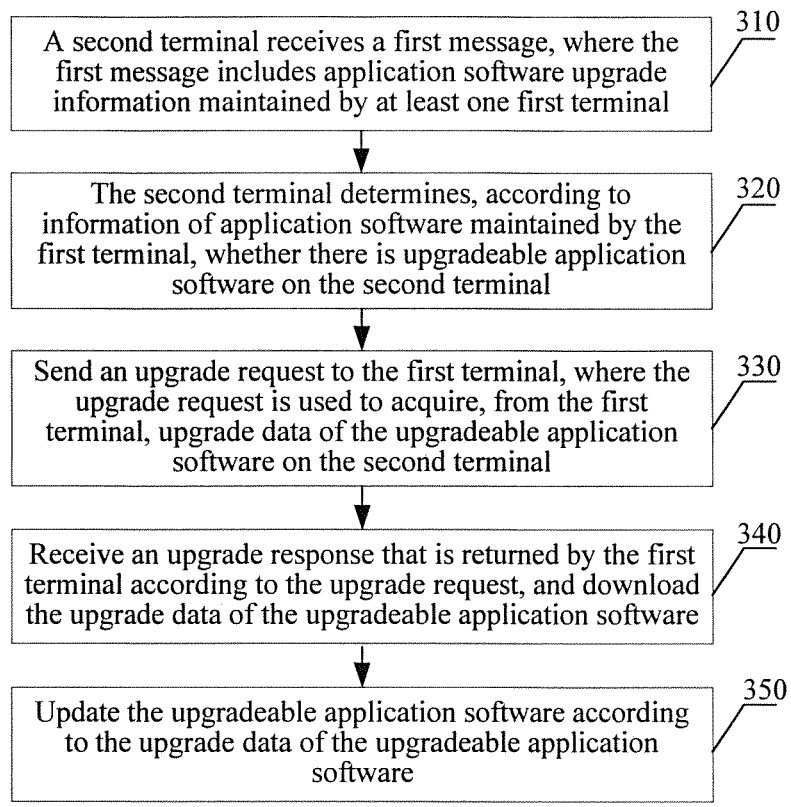
FIG. 3 is a flowchart of a software upgrade method according to an embodiment of the present invention.

FIG. 3 is a flowchart of a software upgrade method according to an embodiment of the present invention. A terminal in this embodiment of the present invention includes, but is not limited to, a desktop, laptop, tablet or handheld computer, a mobile phone, a personal digital assistant (Personal Digital Assistant, PDA), a dedicated media player, and the like.

Step 310: A second terminal receives a first message broadcast by at least one first terminal, where the first message includes information of application software maintained by the first terminal.

Specifically, the second terminal and the at least one first terminal are located in a same local area network, the first terminal maintains application software upgrade information, and the second terminal receives the first message, where the first message includes the application software upgrade information maintained by the first terminal, and the application software upgrade information maintained by the first terminal includes a name of application software, a version number of application software, a recommendation value of application software, a type of application software, and maximum traffic for upgrading application software. The second terminal may receive the first message broadcast by the first terminal, or the second terminal may send a request message to the first terminal, to determine whether the first terminal maintains the application software upgrade information, and when the first terminal maintains the application software upgrade information, the second terminal receives the first message sent by the first terminal.

Step 320: The second terminal determines, according to the information of the application software maintained by the first terminal, whether there is upgradeable application software on the second terminal.

Specifically, the second terminal may determine, according to the software name of the application software, whether there is application software the same as one piece among the application software maintained by the first terminal; then, determine, according to the version information of the application software, whether the application software, the same as the one piece among the application software maintained by the first terminal, on the second terminal needs to be upgraded; and determine, when the application software, the same as the one piece among the application software maintained by the first terminal, on the second terminal needs to be upgraded, that there is upgradeable application software on the second terminal.

More specifically, the second terminal determines whether application software in the application software upgrade information is installed locally, where the second terminal may determine, by using a name of the application software in the application software upgrade information, whether the application software is installed locally. When the application software in the first message has been installed locally, but a version number of the application software installed locally is lower than a version number, of the application software, in the first message, the second terminal determines that the local application software whose version number is lower than the version number, of the application software, in application software upgrade information is the application software that needs to be upgraded, that is, determines a name of the application software that needs to be upgraded and a version number of the application software that needs to be upgraded. Because a quantity of application software that needs to be upgraded in the second terminal is at least one, after the second terminal determines the name of the local application software that needs to be upgraded and the version number of the application software, the second terminal may sort, according to application software recommendation values in the application software upgrade information, the application software upgrade information that can provide an upgrade service.

If application software that provides upgrade for same application software has multiple version numbers, application software upgrade information having a highest application software version number is determined, and when the application software with the highest version number has multiple sources, one piece of the application software upgrade information is selected randomly.

If an application software preference type is set locally, the application software upgrade information is filtered according to the local application software preference type, and the application software preference type that is set locally is compared with an application software type in the application software upgrade information, so that application software upgrade information that conforms to the local application software preference type is determined, and information of application software that needs to be upgraded and corresponds to the application software upgrade information is determined. The application software upgrade information may also be sorted by using a weight formula F (whether a recommendation value and a type conforms). For example, when types of application software are the same, the application software upgrade information is sorted according to recommendation values of the application software.

When it is determined that there is upgradeable application software on the second terminal, perform step 330.

Step 330: Send an upgrade request to the first terminal, where the upgrade request is used to acquire, from the first terminal, upgrade data of the upgradeable application software on the second terminal, and the upgrade data includes a name of the upgradeable application software on the second terminal.

Specifically, the second terminal sends the upgrade request to the first terminal. The request carries a name of local application software that needs to be upgraded, and when necessary, may also carry a version number of the application software that needs to be upgraded.

Step 340: Receive an upgrade response that is returned by the first terminal according to the upgrade request, and download the upgrade data of the upgradeable application software.

Specifically, the second terminal downloads, according to the name of the local application software that needs to be upgraded and the version number of the application software that needs to be upgraded, application software upgrade information that is in the first terminal and corresponds to the name of the application software that needs to be upgraded and the version number of the application software that needs to be upgraded.

After step 340, step 350 is further included: updating, by the second terminal, the upgradeable application software according to the upgrade data of the upgradeable application software.

Therefore, by means of the application of the terminal provided in this embodiment of the present invention, a second terminal receives a first message, where the first message includes application software upgrade information maintained by at least one first terminal; information of local application software that needs to be upgraded is determined according to the application software upgrade information; the second terminal sends a download request to the first terminal, where the download request carries the information of the local application software that needs to be upgraded; and the application software upgrade information maintained by the first terminal is downloaded according to the information of the local application software that needs to be upgraded. Therefore, software upgrade between terminals is implemented, so that in a case in which a terminal is not connected to the Internet or there is no related upgrade service available on the Internet, software upgrade of the terminal can still be implemented.

In another implementation manner, because there may be more than one first terminal located in a same local area network, first messages broadcast by multiple first terminals may be received simultaneously, and the first messages separately carry information of application software maintained by different first terminals. In this case, after step 320, the method further includes: determining, by the second terminal, a target first terminal from the at least one first terminal according to information of application software maintained by each first terminal among the at least one first terminal.

For example, when there is one or more pieces of same application software among application software maintained by different first terminals, the first terminal may determine the target first terminal of the second terminal according to different version numbers, in the information of the application software maintained by each first terminal, of the upgradeable application software of the second terminal. After the target first terminal is determined, in step 330, the upgrade request is sent to the target first terminal.

Figure 4:
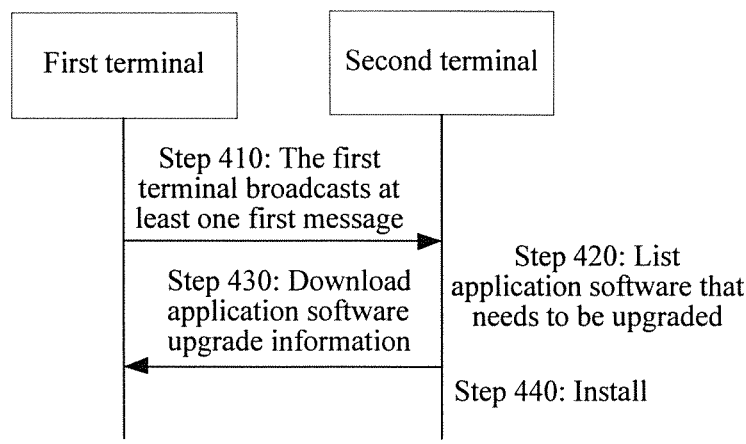
FIG. 4 is a diagram of interaction between a first terminal and a second terminal according to an embodiment of the present invention.

FIG. 4 is a diagram of interaction between a first terminal and a second terminal according to an embodiment of the present invention. This embodiment includes a first terminal and a second terminal. The first terminal and the second terminal are located in a same WIFI local area network.

Step 410: The first terminal broadcasts at least one first message.

Specifically, the first terminal may broadcast the first message by using wifi. The first message includes information of application software maintained locally, and the information of the application software includes a software name of the application software and a version number of the application software.

Figure 5:
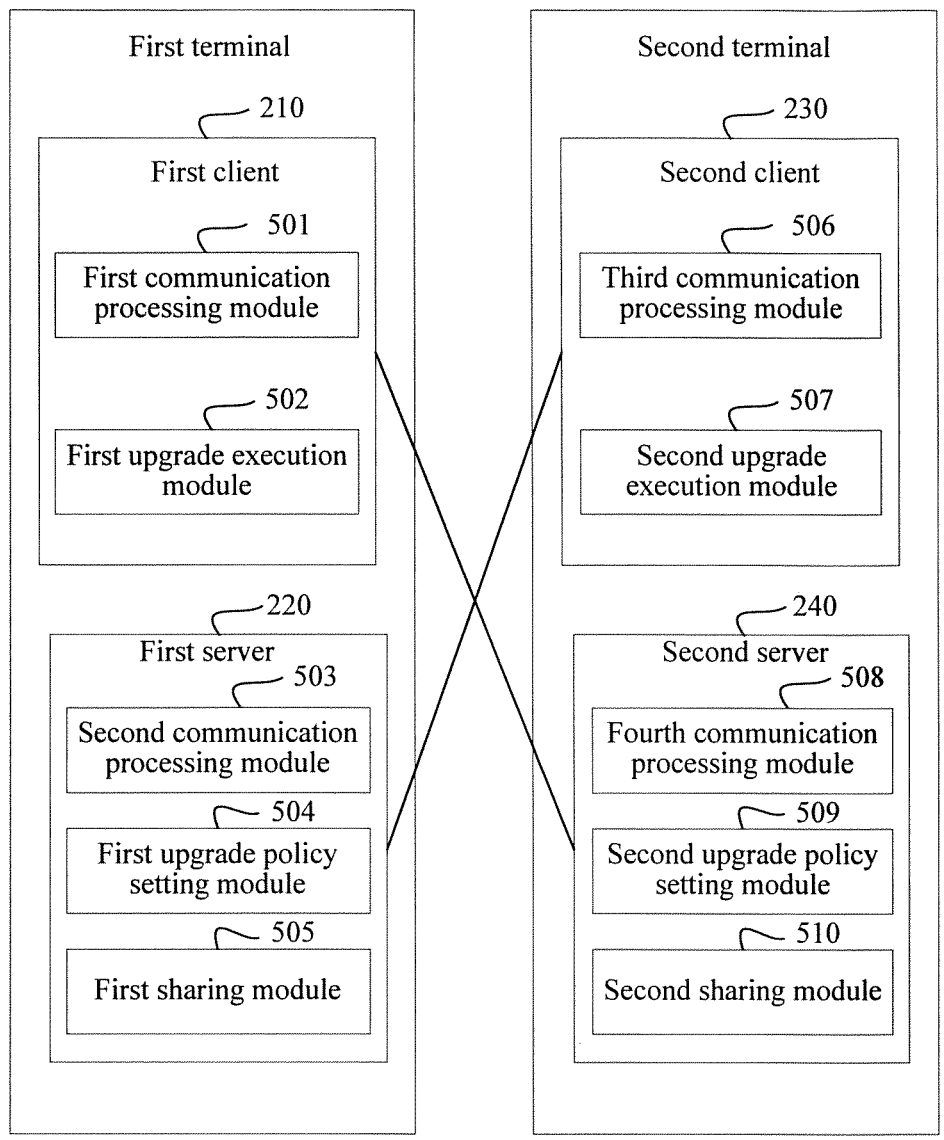
FIG. 5 is a structural diagram of an embodiment of a terminal according to an embodiment of the present invention.

Refer to a second structural diagram of the terminals shown in FIG. 5. In FIG. 5, the first terminal includes a first client 210 and a first server 220, the first client 210 includes a first communication processing module 501 and a first upgrade execution module 502, and the first server includes a second communication processing module 503, a first upgrade policy setting module 504, and a first sharing module 505. The second terminal includes a second client 230 and a second server 240, the second client 230 includes a third communication processing module 506 and a second upgrade execution module 507, and the second server 240 includes a fourth communication processing module 508, a second upgrade policy setting module 509, and a second sharing module 510.

The first server 220 in the first terminal maintains application software upgrade information. In the first server 220, the first terminal sets some local application software to an upgradeable state by using the first sharing module 505, and sets an upgrade policy of the foregoing application software by using the first upgrade policy setting module 504, where the upgrade policy may be maximum traffic for upgrading the application software, a recommendation value of the application software, a type of the application software, a version number of the application software or the like. The first sharing module 505 invokes the second communication processing module 503 to broadcast software upgrade information of the application software by using WIFI.

Step 420: The second terminal determines application software that needs to be upgraded.

Specifically, in the second client 230, after monitoring a broadcast message by using the second upgrade execution module 507, the second terminal checks whether application software in the application software upgrade information shared by the first sharing module 505 is installed in the local terminal, and when a version number of installed application software is lower than a version number, of the application software, in the shared application software upgrade information, upgrade information of all upgradeable application software is indicated and presented on the second client 230, and the application software upgrade information is sorted according to recommendation values.

If there are multiple application software version numbers in same monitored application software upgrade information, application software upgrade information having a highest application software version number is selected, and when application software with the highest version number has multiple sources, one piece of the application software upgrade information is selected randomly.

If the second upgrade execution module 507 on the second client 230 sets a local application software preference type, when the application software upgrade information is monitored, the application software upgrade information is filtered according to an application software type in the application software upgrade information, and only application software upgrade information having a conforming type is displayed. The second client 230 may also sort the application software upgrade information by using a weight formula F. For example, first according to whether the application software type conforms to the local application software preference type set by the second upgrade execution module 507, when the application software type conforms to the local application software preference type, the application software upgrade information is sorted according to application software recommendation values in the application software upgrade information.

Step 430: The second terminal downloads the application software.

Specifically, when it is determined that there is upgradeable application software on the second terminal, an upgrade request is sent to the first terminal; after receiving the upgrade request sent by the second terminal, the first terminal sends an upgrade response to the second terminal, to trigger the second terminal to download, from the first terminal, upgrade data of the upgradeable application software.

The upgrade request is used to acquire, from the first terminal, the upgrade data of the upgradeable application software on the second terminal, and the upgrade data includes a name of the upgradeable application software on the second terminal, and the upgradeable application software on the second terminal is determined by the second terminal according to the information of the application software maintained by the first terminal.

With reference to FIG. 5, the second upgrade execution module 507 downloads the application software upgrade information in the first terminal by using the third communication processing module 506 and the second communication processing module 503. If at this time, download traffic exceeds maximum upgrade traffic of the application software in the application software upgrade information, the first terminal limits download traffic by using the first sharing module 505.

Step 440: The second terminal installs the application software.

Specifically, after the second terminal downloads the application software upgrade information, the second upgrade execution module 507 installs the downloaded application software upgrade information, and upgrade is completed after the installation succeeds.

It may be understood that, in this embodiment, there may be multiple first terminals, and the first terminal and the second terminal can perform upgrade mutually.

Therefore, by using the terminals provided in this embodiment of the present invention, in a case in which the terminals are not connected to the Internet or it is difficult to find resources on the Internet, an upgrade service of application software is obtained.

Figure 6:
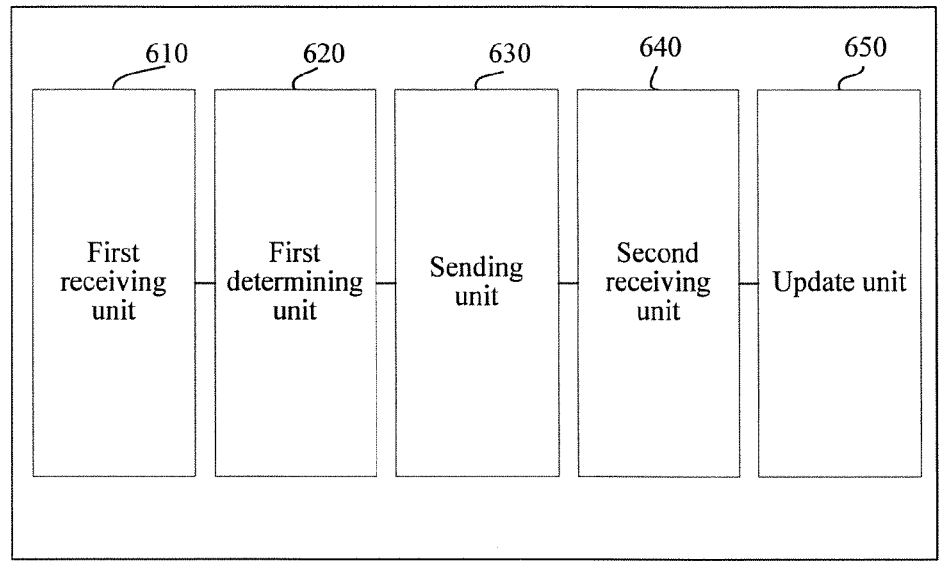
FIG. 6 is a structural diagram of an embodiment of a terminal according to an embodiment of the present invention.
Figure 7:
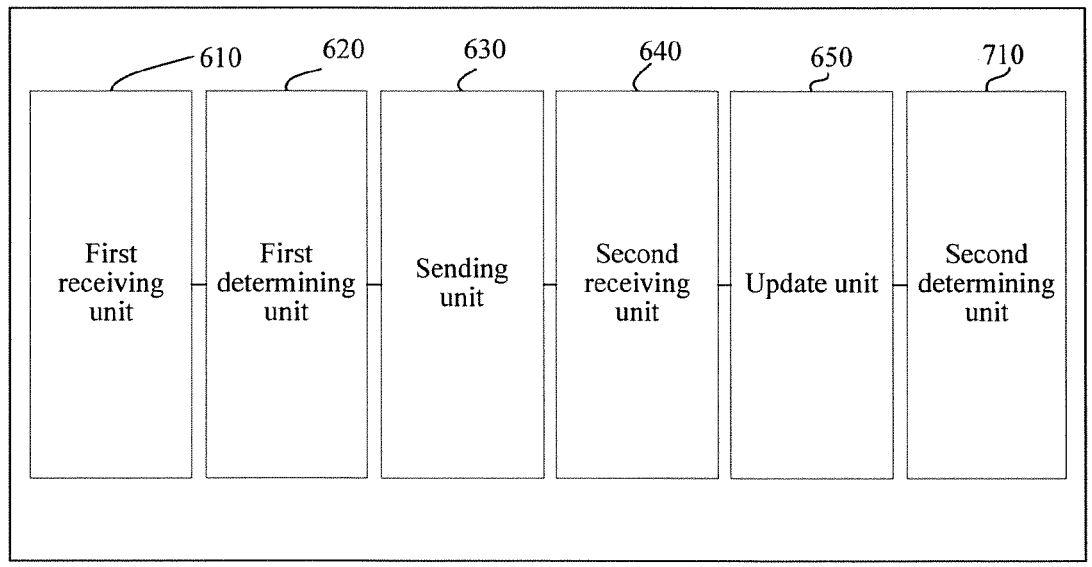
FIG. 7 is a structural diagram of an embodiment of a terminal according to an embodiment of the present invention.

Correspondingly, an embodiment of the present invention further provides a terminal, used to implement the software upgrade method in the foregoing embodiments. FIG. 6 is a second apparatus diagram of the terminal according to this embodiment of the present invention. As shown in FIG. 6, this embodiment includes: a first receiving unit 610, a first determining unit 620, a sending unit 630, a second receiving unit 640, and an update unit 650. The terminal in this embodiment of the present invention includes, but is not limited to, a desktop, laptop, tablet or handheld computer, a mobile phone, a PDA, a dedicated media player or the like.

The first receiving unit 610 is configured to receive a first message broadcast by the at least one first terminal, where the first message includes information of application software maintained by the first terminal, and the information of the application software includes a software name of the application software and version information of the application software.

The first determining unit 620 is configured to determine, according to the information of the application software maintained by the first terminal, whether there is upgradeable application software on the local terminal.

The sending unit 630 is configured to: when it is determined that there is upgradeable application software on the local terminal, send an upgrade request to the first terminal, where the upgrade request is used to acquire, from the first terminal, upgrade data of the upgradeable application software on the local terminal, and includes a name of the upgradeable application software on the local terminal.

The second receiving unit 640 is configured to receive an upgrade response that is returned by the first terminal according to the upgrade request, and download the upgrade data of the upgradeable application software.

The update unit 650 is configured to update the upgradeable application software according to the upgrade data of the upgradeable application software.

In an embodiment, the first determining unit 620 further includes:

a first determining subunit, configured to determine, according to the software name of the application software, whether there is application software the same as one piece among the application software maintained by the first terminal;

a second determining subunit, configured to determine, according to the version information of the application software, whether the application software, the same as the one piece among the application software maintained by the first terminal, on the second terminal needs to be upgraded; and a third determining subunit, configured to: when the application software, the same as the one piece among the application software maintained by the first terminal, on the second terminal needs to be upgraded, determine that there is upgradeable application software on the second terminal.

In another embodiment, the terminal further includes:

a second determining unit 710, configured to determine a target first terminal from the at least one first terminal according to information of application software maintained by each first terminal among the at least one first terminal; where the sending unit is specifically configured to send the upgrade request to the target first terminal.

Preferably, the second determining unit determines the target first terminal of the second terminal according to different version numbers, in the information of the application software maintained by each first terminal, of the upgradeable application software of the second terminal.

In a possible implementation manner, the information of the application software maintained by the first terminal further includes an upgrade policy of the application software, and the upgrade policy specifically includes: maximum traffic for upgrading and/or a recommendation value of the application software and/or a type of the application software.

The first determining unit is further configured to determine, according to the upgrade policy, whether there is upgradeable application software on the local terminal.

Therefore, by means of the application of the terminal provided in this embodiment of the present invention, a second terminal receives a first message, where the first message includes application software upgrade information maintained by at least one first terminal; information of local application software that needs to be upgraded is determined according to the application software upgrade information; the second terminal sends a download request to the first terminal, where the download request carries the information of the local application software that needs to be upgraded; and the application software upgrade information maintained by the first terminal is downloaded according to the information of the local application software that needs to be upgraded. Therefore, software upgrade between terminals is implemented, so that in a case in which a terminal is not connected to the Internet or there is no related upgrade service available on the Internet, software upgrade of the terminal can still be implemented.

Figure 8:
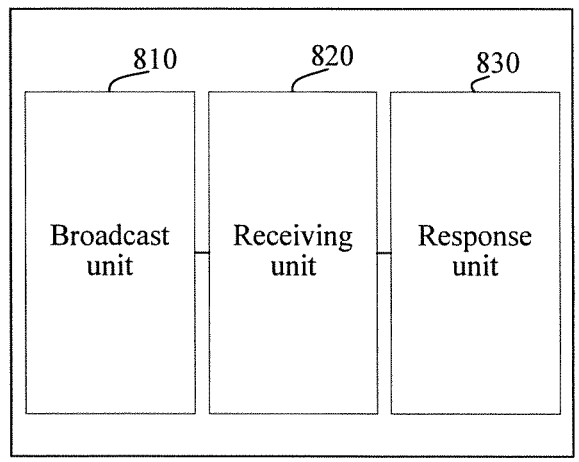
FIG. 8 is a structural diagram of an embodiment of a terminal according to an embodiment of the present invention.

Correspondingly, an embodiment of the present invention further provides a terminal, used to implement the software upgrade method in the foregoing embodiments, and the terminal may be the first terminal in the foregoing embodiments. FIG. 8 is a second apparatus diagram of the terminal according to this embodiment of the present invention. As shown in FIG. 8, this embodiment includes: a broadcast unit 810, a receiving unit 820, and a response unit 830. The terminal in this embodiment of the present invention includes, but is not limited to, a desktop, laptop, tablet or handheld computer, a mobile phone, a PDA, a dedicated media player or the like.

The broadcast unit 810 is configured to broadcast at least one first message, where the first message includes information of application software maintained locally, and the information of the application software includes a software name of the application software and a version number of the application software.

The receiving unit 820 is configured to receive an upgrade request sent by the second terminal, where the upgrade request is used to acquire, from the local terminal, upgrade data of upgradeable application software on the second terminal, and the upgrade data includes a name of the upgradeable application software on the second terminal, and the upgradeable application software on the second terminal is determined by the second terminal according to the information of the application software maintained locally.

The response unit 830 is configured to send an upgrade response to the second terminal, to trigger the second terminal to download, from the local terminal, the upgrade data of the upgradeable application software.

For description of the embodiment of the terminal, reference may be made to the method embodiments shown in FIG. 3 and FIG. 4, and no further details are provided again.

In an optional implementation manner, the information of the application software further includes an upgrade policy of the application software, and the upgrade policy specifically includes: maximum traffic for upgrading and/or a recommendation value of the application software and/or a type of the application software; and the terminal further includes:

a download control unit, configured to: when download traffic of the second terminal exceeds the download traffic threshold, limit the download traffic of the second terminal.

Therefore, by means of the application of the terminal provided in this embodiment of the present invention, software upgrade between terminals is implemented, and in a case in which a terminal is not connected to the Internet or there is no related upgrade service available on the Internet, software upgrade of the terminal can still be implemented.

Figure 9:
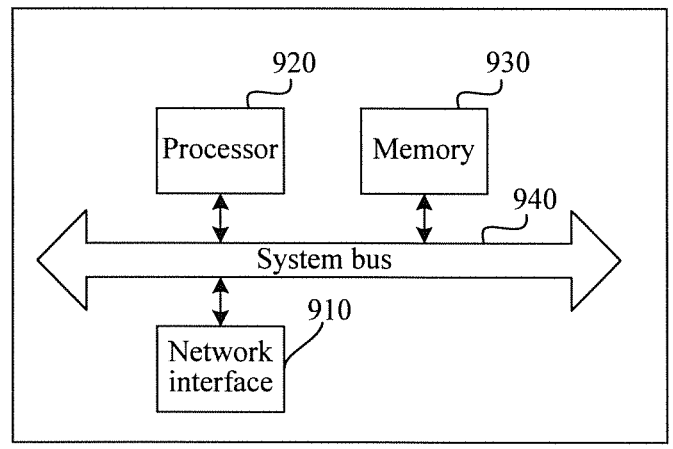
FIG. 9 is a structural diagram of an embodiment of a terminal according to an embodiment of the present invention.

In addition, an embodiment of the present invention further provides an embodiment of another terminal. FIG. 9 is a fourth apparatus diagram of the terminal according to this embodiment of the present invention. As shown in FIG. 9, the terminal is used to implement the foregoing software upgrade method for a terminal, and includes: a network interface 910, a processor 920, and a memory 930. A system bus 940 is configured to connect the network interface 910, the processor 920, and the memory 930.

The network interface 910 is configured to perform communication connection with a server, and may further receive a click input of a user. The network interface 910 may be an Ethernet interface, a fiber interface or the like in wired communications, or may be a WiFi wireless WAN card, a Bluetooth module, a cellular network access module or the like in wireless communications.

The click input of the user may be a single-point input or a multiple-point input, or may be an input from an input device such as a touch pad or a touch screen, where the touch pad or the touch screen may be based on various touch-sensitive technologies, for example, capacitive sensing, resistive sensing, surface acoustic wave sensing, pressure sensing, and light sensing.

The processor 920 may control reception and manipulation of input and output data between components of a computer system.

As an example rather than a limitation, the processor 920 may be implemented on a single chip, multiple chips or multiple electronic elements, and various architectures, including a dedicated or embedded processor, a dedicated processor, a controller, an ASIC, and the like, may be used.

The memory 930 is operatively connected to the processor 920, and is configured to store an operating system, application program information, and the like used by the terminal.

As an example rather than a limitation, the memory 930 in this embodiment of the present invention may be a read-only memory (ROM), a random access memory (RAM), a hard disk drive or the like. Information may also reside on a removable storage medium and is loaded or installed into a computer system when needed, and the removable storage medium includes, for example, a CD-ROM, a PC-CARD, a memory card, a floppy disk, a magnetic tape, and a network component.

The system bus 940 is configured to connect the terminal to the Internet and can perform data communication with a server deployed on the Internet, or may be configured to perform interconnection and communication between multiple terminal devices.

During startup, the software components are loaded into the memory 930, and then accessed by the processor 920 to execute the following instructions:

receiving, by using the network interface 910, a first message broadcast by the at least one first terminal, where the first message includes information of application software maintained by the first terminal, and the information of the application software includes a software name of the application software and version information of the application software;

determining, by the processor 920 according to the information of the application software maintained by the first terminal, whether there is upgradeable application software on a second terminal;

when it is determined that there is upgradeable application software on the second terminal, sending an upgrade request to the first terminal by using the network interface 910, where the upgrade request is used to acquire, from the first terminal, upgrade data of the upgradeable application software on the second terminal, and the upgrade data includes a name of the upgradeable application software on the second terminal;

receiving, by using the network interface 910, an upgrade response that is returned by the first terminal according to the upgrade request, and downloading the upgrade data of the upgradeable application software; and updating, by the processor 920, the upgradeable application software according to the upgrade data of the upgradeable application software.

Therefore, by means of the application of the terminal provided in this embodiment of the present invention, a second terminal receives a first message, where the first message includes application software upgrade information maintained by at least one first terminal; information of local application software that needs to be upgraded is determined according to the application software upgrade information; the second terminal sends a download request to the first terminal, where the download request carries the information of the local application software that needs to be upgraded; and the application software upgrade information maintained by the first terminal is downloaded according to the information of the local application software that needs to be upgraded. Therefore, software upgrade between terminals is implemented, so that in a case in which a terminal is not connected to the Internet or there is no related upgrade service available on the Internet, software upgrade of the terminal can still be implemented.

Figure 10:
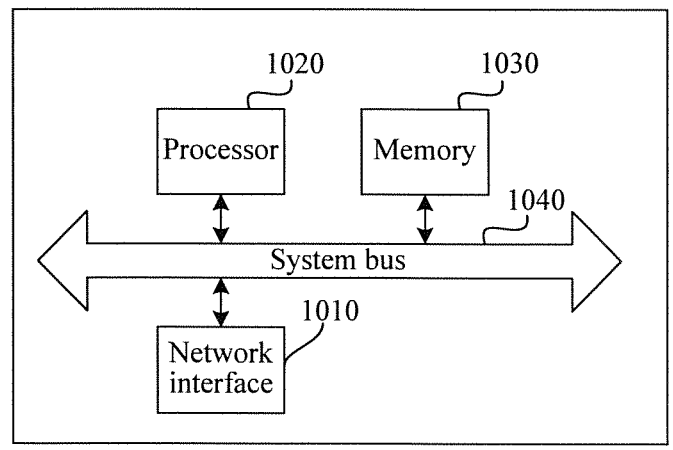
FIG. 10 is a structural diagram of an embodiment of a terminal according to an embodiment of the present invention.

In addition, as shown in FIG. 10, an embodiment of the present invention further provides an embodiment of another terminal, and corresponding to the first terminal in the embodiment shown in FIG. 2, FIG. 10 is a fourth apparatus diagram of the terminal according to this embodiment of the present invention. As shown in FIG. 10, the terminal is used to implement the foregoing software upgrade method for a terminal, and includes: a network interface 1010, a processor 1020, and a memory 1030. A system bus 1040 is configured to connect the network interface 1010, the processor 1020, and the memory 1030.

The network interface 1010 is configured to perform communication connection with a server, and may further receive a click input of a user. The network interface 1010 may be an Ethernet interface, a fiber interface or the like in wired communications, or may be a WiFi wireless WAN card, a Bluetooth module, a cellular network access module or the like in wireless communications.

The click input of the user may be a single-point input or a multiple-point input, or may be an input from an input device such as a touch pad or a touch screen, where the touch pad or the touch screen may be based on various touch-sensitive technologies, for example, capacitive sensing, resistive sensing, surface acoustic wave sensing, pressure sensing, and light sensing.

The processor 1020 may control reception and manipulation of input and output data between components of a computer system.

As an example rather than a limitation, the processor 1020 may be implemented on a single chip, multiple chips or multiple electronic elements, and various architectures, including a dedicated or embedded processor, a dedicated processor, a controller, an ASIC, and the like, may be used.

The memory 1030 is operatively connected to the processor 1020, and is configured to store an operating system, application program information, and the like used by the terminal.

As an example rather than a limitation, the memory 930 in this embodiment of the present invention may be a read-only memory (ROM), a random access memory (RAM), a hard disk drive or the like. Information may also reside on a removable storage medium and is loaded or installed into a computer system when needed, and the removable storage medium includes, for example, a CD-ROM, a PC-CARD, a memory card, a floppy disk, a magnetic tape, and a network component.

The system bus 1040 is configured to connect the terminal to the Internet and can perform data communication with a server deployed on the Internet, or may be configured to perform interconnection and communication between multiple terminal devices.

During startup, the software components are loaded into the memory 1030, and then accessed by the processor 1020 to execute the following instructions:

broadcasting at least one first message by using the network interface 1010, where the first message includes information of application software maintained locally, and the information of the application software includes a software name of the application software and a version number of the application software;

receiving, by using the network interface 1010, an upgrade request sent by a second terminal, where the upgrade request is used to acquire, from the first terminal, upgrade data of upgradeable application software on the second terminal, and the upgrade data includes a name of the upgradeable application software on the second terminal, and the upgradeable application software on the second terminal is determined by the second terminal according to the information of the application software maintained by the first terminal; and sending an upgrade response to the second terminal by using the network interface 1010, to trigger the second terminal to download, from the first terminal, the upgrade data of the upgradeable application software.

Therefore, by means of the application of the terminal provided in this embodiment of the present invention, software upgrade between terminals can be implemented, and in a case in which a terminal is not connected to the Internet or there is no related upgrade service available on the Internet, software upgrade of the terminal can still be implemented.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may be configured in a random access memory (RAM), memory, a read-only memory (ROM), an electrically programmable ROM, an electrically erasable programmable ROM, a register, a hard disk, a removable disk, a CD-ROM, or a storage medium in any other forms well-known in the art.

In the foregoing specific implementation manners, the objective, technical solutions, and benefits of the present invention are further described in detail. It should be understood that the foregoing descriptions are merely specific implementation manners of the present invention, but are not intended to limit the protection scope of the present invention. Any modification, equivalent replacement, or improvement made without departing from the spirit and principle of the present invention should fall within the protection scope of the present invention.

What is claimed is:

1. A software upgrade method, applied to a second terminal in a local area network, wherein the local area network further comprises at least one first terminal, the method comprising:
   receiving, by the second terminal, a first message broadcast by the at least one first terminal, wherein the first message comprises information of application software maintained by the first terminal, and the information of the application software comprises a software name of the application software, version information of the application software, and an upgrade policy of the application software, wherein the upgrade policy comprises a maximum traffic for upgrading and a recommendation value of the application software;
   sorting the information of application software according to the recommendation value;
   determining, by the second terminal according to the information of the application software maintained by the first terminal, including the upgrade policy, whether there is upgradeable application software on the second terminal;
   when there is upgradeable application software on the second terminal, sending an upgrade request to the first terminal, wherein the upgrade request is used to acquire, from the first terminal, upgrade data of the upgradeable application software on the second terminal, and the upgrade data comprises a name of the upgradeable application software on the second terminal;
   receiving, by the second terminal, an upgrade response that is returned by the first terminal according to the upgrade request, and downloading the upgrade data of the upgradeable application software, including, when download traffic of the second terminal exceeds the maximum traffic for upgrading, limiting download traffic of the second terminal; and
   updating the upgradeable application software according to the upgrade data of the upgradeable application software.

2. The method according to claim 1, wherein determining, by the second terminal according to the information of the application software maintained by the first terminal, whether there is upgradeable application software on the second terminal comprises:
   determining, according to the software name of the application software, whether there is application software corresponding to the application software maintained by the first terminal;
   determining, according to the version information of the application software, whether the application software, corresponding to the application software maintained by the first terminal, on the second terminal needs to be upgraded; and
   when the application software, corresponding to the application software maintained by the first terminal, on the second terminal needs to be upgraded, determining that there is upgradeable application software on the second terminal.

3. The method according to claim 1, wherein:
   after determining, by the second terminal according to the information of the application software maintained by the first terminal, whether there is upgradeable application software on the second terminal, the method further comprises:
   determining a target first terminal from the at least one first terminal according to information of application software maintained by each first terminal among the at least one first terminal; and
   sending an upgrade request to the first terminal comprises: sending the upgrade request to the target first terminal.

4. The method according to claim 3, wherein determining a target first terminal from the at least one first terminal according to information of application software maintained by each first terminal among the at least one first terminal comprises:
   determining the target first terminal of the second terminal according to different version numbers, in the information of the application software maintained by each first terminal, of the upgradeable application software of the second terminal.

5. The method according to claim 1, wherein:
   the upgrade policy further comprises type of the application software.

6. A software upgrade method, applied to a first terminal in a local area network, wherein the local area network further comprises at least one second terminal, the method comprising:
   broadcasting, by the first terminal, at least one first message, wherein the first message comprises information of application software maintained locally, and the information of the application software comprises a software name of the application software, a version number of the application software, and an upgrade policy of the application software, wherein the upgrade policy comprises a maximum traffic for upgrading and a recommendation value of the application software for sorting the information of application software;
   receiving an upgrade request sent by the second terminal, wherein the upgrade request is used to acquire, from the first terminal, upgrade data of upgradeable application software on the second terminal, and the upgrade data comprises a name of the upgradeable application software on the second terminal, and the upgradeable application software on the second terminal is determined by the second terminal according to the information of the application software maintained by the first terminal;
   sending an upgrade response to the second terminal, to trigger the second terminal to download, from the first terminal, the upgrade data of the upgradeable application software; and
   when download traffic of the second terminal exceeds the maximum traffic for upgrading, limiting, by the first terminal, download traffic of the second terminal.

7. The method according to claim 6, wherein:
   the upgrade policy further comprises a type of the application software.

8. A terminal, wherein the terminal and at least one first terminal are located in a same local area network, the terminal comprising:
- a first receiving unit, configured to receive a first message broadcast by the at least one first terminal, wherein the first message comprises information of application software maintained by the first terminal, and the information of the application software comprises a software name of the application software, version information of the application software, and an upgrade policy of the application software, wherein the upgrade policy comprises a maximum traffic for upgrading and a recommendation value of the application software;
- a first determining unit, configured to determine, according to the information of the application software maintained by the first terminal, including the upgrade policy, whether there is upgradeable application software on the local terminal, including sorting the information of application software according to the recommendation value;
- a sending unit, configured to: when there is upgradeable application software on the local terminal, send an upgrade request to the first terminal, wherein the upgrade request is used to acquire, from the first terminal, upgrade data of the upgradeable application software on the local terminal, and comprises a name of the upgradeable application software on the local terminal;
- a second receiving unit, configured to receive an upgrade response that is returned by the first terminal according to the upgrade request, and download the upgrade data of the upgradeable application software, including, when download traffic of the terminal exceeds the maximum traffic for upgrading, limiting download traffic of the terminal; and
- an update unit, configured to update the upgradeable application software according to the upgrade data of the upgradeable application software.

9. The terminal according to claim 8, wherein the first determining unit further comprises:
- a first determining subunit, configured to determine, according to the software name of the application software, whether there is application software corresponding to the application software maintained by the first terminal;
- a second determining subunit, configured to determine, according to the version information of the application software, whether the application software, corresponding to the application software maintained by the first terminal, on the second terminal needs to be upgraded; and
- a third determining subunit, configured to: when the application software, corresponding to the application software maintained by the first terminal, on the second terminal needs to be upgraded, determine that there is upgradeable application software on the second terminal.

10. The terminal according to claim 8, further comprising:
- a second determining unit, configured to determine a target first terminal from the at least one first terminal according to information of application software maintained by each first terminal among the at least one first terminal; and
- wherein the sending unit is configured to send the upgrade request to the target first terminal.

11. The terminal according to claim 10, wherein the second determining unit is configured to determine the target first terminal of the second terminal according to different version numbers, in the information of the application software maintained by each first terminal, of the upgradeable application software of the second terminal.

12. The terminal according to claim 8, wherein:
the upgrade policy further comprises a type of the application software.

13. A terminal, applied in a local area network, wherein the local area network further comprises at least one second terminal, the terminal comprising:
- a broadcast unit, configured to broadcast at least one first message, wherein the first message comprises information of application software maintained locally, and the information of the application software comprises a software name of the application software, a version number of the application software, and an upgrade policy of the application software, wherein the upgrade policy comprises a maximum traffic for upgrading and a recommendation value of the application software for sorting the information of application software;
- a receiving unit, configured to receive an upgrade request sent by the second terminal, wherein the upgrade request is used to acquire, from the local terminal, upgrade data of upgradeable application software on the second terminal, and the upgrade data comprises a name of the upgradeable application software on the second terminal, and the upgradeable application software on the second terminal is determined by the second terminal according to the information of the application software maintained locally, including the upgrade policy; and
- a response unit, configured to send an upgrade response to the second terminal, to trigger the second terminal to download, from the local terminal, the upgrade data of the upgradeable application software, and
- a download control unit, configured to: when download traffic of the second terminal exceeds the maximum traffic for upgrading, limit the download traffic of the second terminal.

14. The terminal according to claim 13, wherein the upgrade policy further comprises: a recommendation value of the application software and/or a type of the application software.

15. A terminal, wherein the terminal and at least one first terminal are located in a same local area network, the terminal comprising:
- a network interface, a processor and a memory interconnected via a bus; and
- an application program physically stored in the memory, wherein the application program comprises instructions that can be used to enable the processor to:
  - receive, by using the network interface, a first message broadcast by the at least one first terminal, wherein the first message comprises information of application software maintained by the first terminal, and the information of the application software comprises a software name of the application software, version information of the application software, and an upgrade policy of the application software, wherein the upgrade policy comprises a maximum traffic for upgrading and a recommendation value of the application software,
  - sort the information of application software according to the recommendation value,
  - determine, by the processor according to the information of the application software maintained by the first terminal, including the upgrade policy, whether there is upgradeable application software on the second terminal, when there is upgradeable application software on the second terminal, send an upgrade request to the first terminal by using the network interface, wherein the upgrade request is used to acquire, from the first terminal, upgrade data of the upgradeable application software on the second terminal, and the upgrade data comprises a name of the upgradeable application software on the second terminal, receive, by using the network interface, an upgrade response that is returned by the first terminal according to the upgrade request, and download the upgrade data of the upgradeable application software, including, when download traffic of the terminal exceeds the maximum traffic for upgrading, limiting download traffic of the terminal, and update, by the processor, the upgradeable application software according to the upgrade data of the upgradeable application software.

16. A terminal, wherein the terminal and at least one second terminal are located in a same local area network, the terminal comprising:

a network interface, a processor and a memory interconnected via a bus; and an application program physically stored in the memory, wherein the application program comprises instructions that can be used to enable the processor to:

broadcast at least one first message by using the network interface, wherein the first message comprises information of application software maintained locally, and the information of the application software comprises a software name of the application software, a version number of the application software, and an upgrade policy of the application software, wherein the upgrade policy comprises a maximum traffic for upgrading and a recommendation value of the application software for sorting the information of application software, receive, by using the network interface, an upgrade request sent by the second terminal, wherein the upgrade request is used to acquire, from the first terminal, upgrade data of upgradeable application software on the second terminal, and the upgrade data comprises a name of the upgradeable application software on the second terminal, and the upgradeable application software on the second terminal is determined by the second terminal according to the information of the application software maintained by the first terminal, including the upgrade policy, send an upgrade response to the second terminal by using the network interface, to trigger the second terminal to download, from the first terminal, the upgrade data of the upgradeable application software, and when download traffic of the second terminal exceeds the maximum traffic for upgrading, limit download traffic of the second terminal.

* * * * *